Z. DOMINGUEZ.
TRACTOR PLOW IMPLEMENT.
APPLICATION FILED JAN. 3, 1921.
1,430,219.
Patented Sept. 26, 1922.
2 SHEETS—SHEET 1.
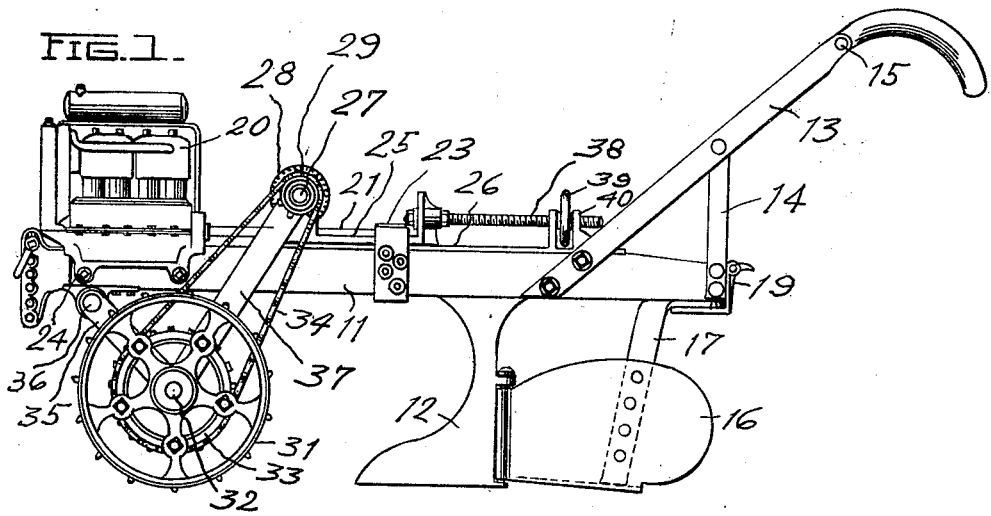
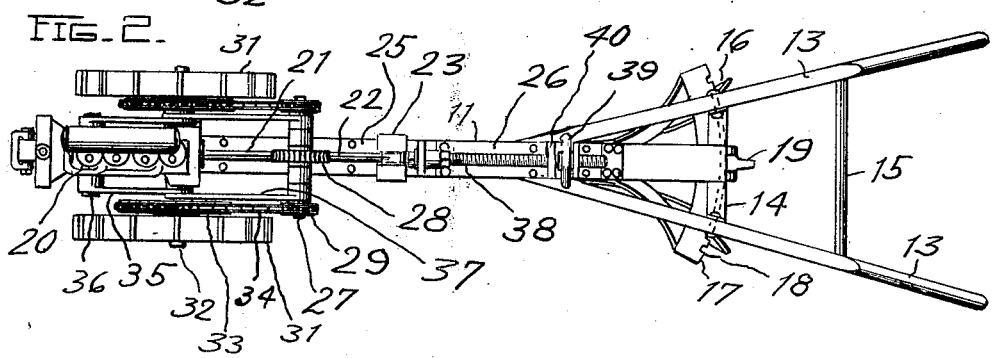
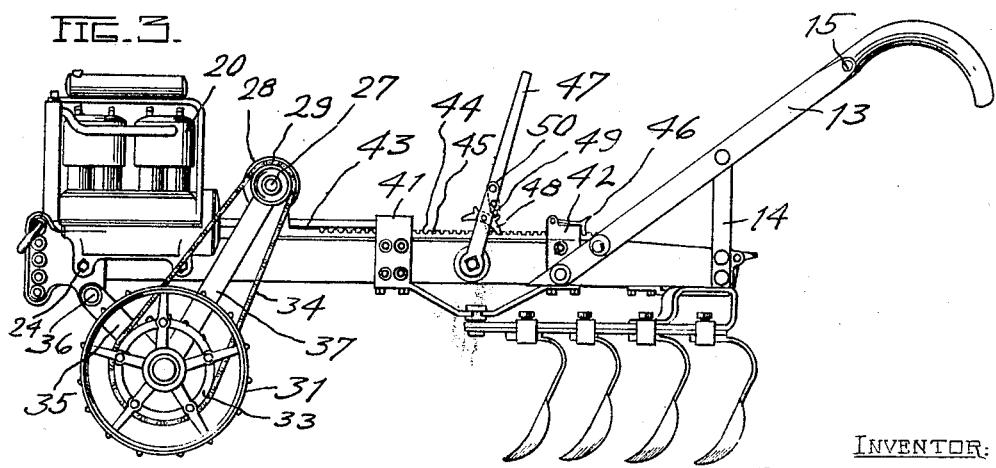
INVENTOR:
ZACARIAS DOMINGUEZ.
Frederic M. Keeney
ATTY.

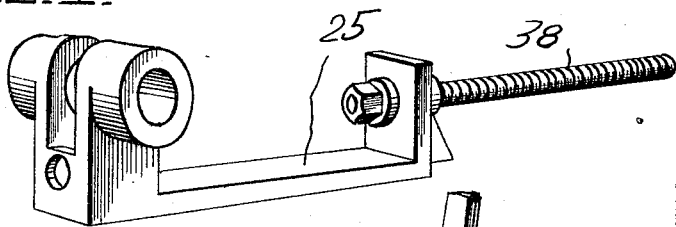
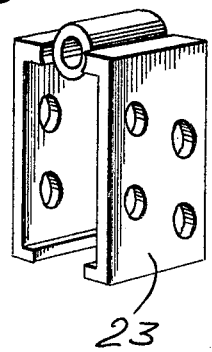
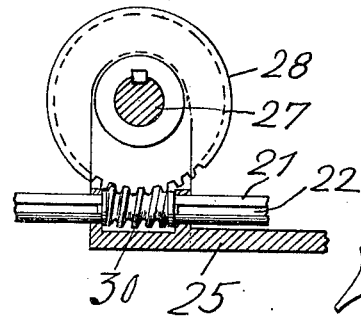
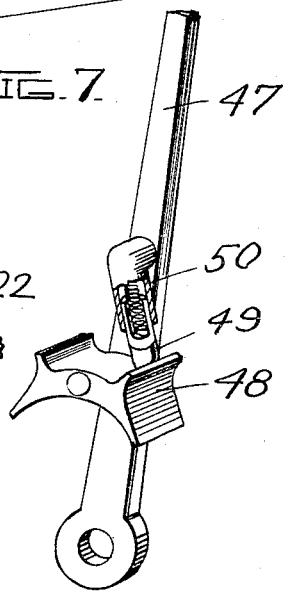

Patented Sept. 26, 1922.

1,430,219

UNITED STATES PATENT OFFICE.

ZACARIAS DOMINGUEZ, OF LOS ANGELES, CALIFORNIA.

TRACTOR PLOW IMPLEMENT.

Application filed January 3, 1921. Serial No. 434,692.

*To all whom it may concern:*

Be it known that I, ZACARIAS DOMINGUEZ, a subject of the King of Spain, residing at Los Angeles, in the county of Los Angeles and State of California, have invented a new and useful Tractor Plow Implement, of which the following is a specification.

This invention relates to a tractor implement and especially to a tractor adapted for plowing and cultivating purposes, and general garden work.

The invention has for its object the provision of an improved arrangement of the driving members by which improved traction may be attained and adjustment provided for varying the depth to which the ground may be cultivated or turned.

It is an object of this invention to provide a comparatively light structure which is particularly adapted to light garden implements, and improved means for adjustment thereof, and to further improve devices of this character in sundry details thereof.

Other objects and advantages may appear from the subjoined detail description.

Upon the annexed drawings, Figure 1 is a side elevation of a garden tractor implement embodying my invention. Fig. 2 is a top plan view of the same. Fig. 3 is a side elevation of a modified form of implement provided with cultivator teeth, and different method of adjustment for depth of cut. Fig. 4 is a perspective detail view of the sliding member which carries the gear transmission. Fig. 5 is a perspective detail of the guide for the sliding member. Fig. 6 is a fragmentary and detail view of the gear transmission. Fig. 7 is a perspective detail view of the adjusting lever employed in the modified form.

Assuming the invention to be embodied as illustrated, I provide a plow beam 11, having bolted thereto the standard 12, and handles 13, connected by braces 14 and 15. For turning the soil I provide the pivotal mold-boards 16.

The mold-boards are connected by a sector member 17, provided with a toothed edge 18, and retained in adjusted position by the latch 19, pivotally mounted on the rear end of the plow beam and engaging with the toothed sector member 17.

An adjustable tractor device for operating the plow consists of a motor 20, which is bolted to the forward end of the plow beam, and is provided with a shaft 21, having the longitudinal key-way 22, and journalled on the guide member 23. The motor together with the shaft 21, are removable upon removing the attaching bolts 24, which pass through the plow-beam, and may be quickly detached for other uses and purposes. A bearing member 25 slides upon the guide bar 26 and has journalled therein the countershaft 27 on which are mounted the gear wheel 28 and sprocket wheels 29. The gear wheel 28 is driven by a worm pinion 30 arranged to slide upon and to rotate with the engine shaft 21. Tractor wheels 31 turn independently on the shaft 32, and are provided with sprocket gears 33, connected by the chains 34 with sprocket gears 29. Means to adjust the tractor wheels to and from the beam, consist of swing brackets 35, pivotally connected to the lugs 36 on the bottom of the plow beam, and pivotally connected to the shafts 32. Swing brackets 37 are pivotally connected to the shafts 32 and to the counter shaft 27. The tractor wheels are adjusted by varying the angle of divergence between the pairs of swing brackets. The bearing member 25 is provided with a threaded bar 38 which is actuated longitudinally by rotation of the hand wheel 39, mounted between the lugs 40.

In the modified form shown in Fig. 3 the guide members 41 and 42 retain the bearing member 43 in position. The longitudinal portion 44 of the bearing member is provided with teeth 45, and a latch 46, in engagement therewith, retains the member in adjusted position. A lever 47, pivoted to the plow-beam, is provided with a reversible ratchet pawl 48, which is actuated in engagement with the rack-bar 44, by a spring actuated plunger 49, working in the swivelly mounted casing 50. The bearing member is moved longitudinally to adjust the tractor wheels, and thereby vary the depth of cut taken by the implement.

What is claimed is:

1. In a plow, the combination with a beam, of a bearing member sliding on the beam, retaining members for the bearing member and permitting longitudinal movement thereof, brackets pivoted to the beam, brackets pivotally connected to the bearing member, axial shafts pivotally connected to said brackets, tractor wheels on the axial shafts, a motor mounted on the plow-beam, a counter shaft journalled in the bearing member, a motor power shaft journalled in the bearing member, a worm pinion feathered to the power shaft, a gear in mesh therewith, and keyed to the countershaft, and power transmission elements connecting the tractor wheels and the countershaft.

2. In a plow, the combination with a beam, of a bearing member sliding on the beam, retaining lugs fixed to the beam and serving to retain the bearing member on the beam, brackets pivoted to the beam, brackets pivoted to the bearing member, axial shafts pivotally connected to said brackets, tractor wheels on the axial shafts, a motor on the plow beam, a countershaft journalled in the bearing member, a motor shaft journalled in the bearing member, transmission elements connecting the motor shaft and the counter shaft, transmission elements connecting the tractor wheels and countershaft, and means for adjusting the bearing member longitudinally upon the plow-beam.

3. The combination with an implement embodying a longitudinal beam, of a bearing member sliding on the beam, swing brackets pivoted thereto, swing brackets pivoted to the bearing member, tractor elements carried by the swing brackets, a motor mounted on the beam, transmission elements between the motor and tractor elements, and means for varying the angle of divergence between opposed pairs of the swing brackets to adjust the tractor elements to and from the beam.

4. The combination with an implement embodying a longitudinal beam, of a bearing member sliding on the beam, a motor affixed to the beam, tractor wheels, swing members connecting the tractor wheels with the bearing member, swing members connecting the tractor wheels with lugs on the beam, transmission elements between the motor and the tractor wheels, a screw extending from the bearing member, lugs on the beam at the rear of the bearing member, said screw extending therethrough, and a hand wheel on said screw between said lugs.

In testimony whereof I hereunto affix my signature.

ZACARIAS DOMINGUEZ.